United States Patent [19]

Neu

[11] Patent Number: 4,677,886
[45] Date of Patent: Jul. 7, 1987

[54] HONEYCOMB CUTTER AND CHIP BREAKER/CHAF REMOVER

[75] Inventor: Horst W. Neu, Torrance, Calif.

[73] Assignee: Northrop Corporation, Hawthorne, Calif.

[21] Appl. No.: 808,317

[22] Filed: Dec. 12, 1985

[51] Int. Cl.$^4$ .................... B23P 15/28; B26D 1/14
[52] U.S. Cl. .......................... 82/53; 83/663; 144/218; 225/94; 407/2
[58] Field of Search .............. 83/663, 665, 676; 82/53; 407/2, 115; 29/DIG. 52; 144/39, 218; 409/182; 225/94

[56] References Cited

U.S. PATENT DOCUMENTS

| | | | |
|---|---|---|---|
| 285,051 | 9/1883 | Marcoux | 144/39 |
| 692,028 | 1/1902 | Page | 144/218 |
| 932,373 | 8/1909 | Burns | 144/39 |
| 2,894,583 | 7/1959 | Johnstad | 83/663 |
| 2,929,299 | 3/1960 | Jenkins | 409/182 |
| 3,001,558 | 9/1961 | Showler | 144/218 |
| 3,027,106 | 3/1962 | Brooks | 83/663 |
| 4,335,767 | 6/1982 | Reuter | 144/39 |

FOREIGN PATENT DOCUMENTS 3228671  2/1984  Fed. Rep. of Germany ...... 144/218

*Primary Examiner*—Frank T. Yost
*Assistant Examiner*—Hien H. Phan
*Attorney, Agent, or Firm*—Terry J. Anderson; Robert B. Block

[57] ABSTRACT

A tool in the form of a honeycomb cutter/chip breaker assembly for conveniently and efficiently machining a workpiece of honeycombed material or the like. The assembly includes a honeycomb cutter member having a cutting knife and a shaft. The cutting knife is disc-shaped with a sharp peripheral edge and is formed integrally with the outboard end of the shaft for concurrent rotation therewith. The inboard end of the shaft is adapted to be received by rotational motion imparting mechanisms. The assembly also includes a chip breaker/chaf remover device having a central bore mountable over the shaft with its outboard face in contact with the inboard face of the cutting knife for rotation therewith during operation and use. The radially outward edges of the chip breaker/chaf remover device are formed as sharp breaker edges for breaking the material cut by the cutting knife. Radially inward of the breaker edges of the device are essentially semicircular surfaces for the removing of the broken or chaf material from adjacent the workpiece. The cutting knife first cuts the workpiece and the cut portions or chips of the workpiece are then broken and then the broken chaf removed, all continuously and simultaneously, without the need for stopping the operation of the tool.

9 Claims, 6 Drawing Figures

U.S. Patent Jul. 7, 1987 4,677,886
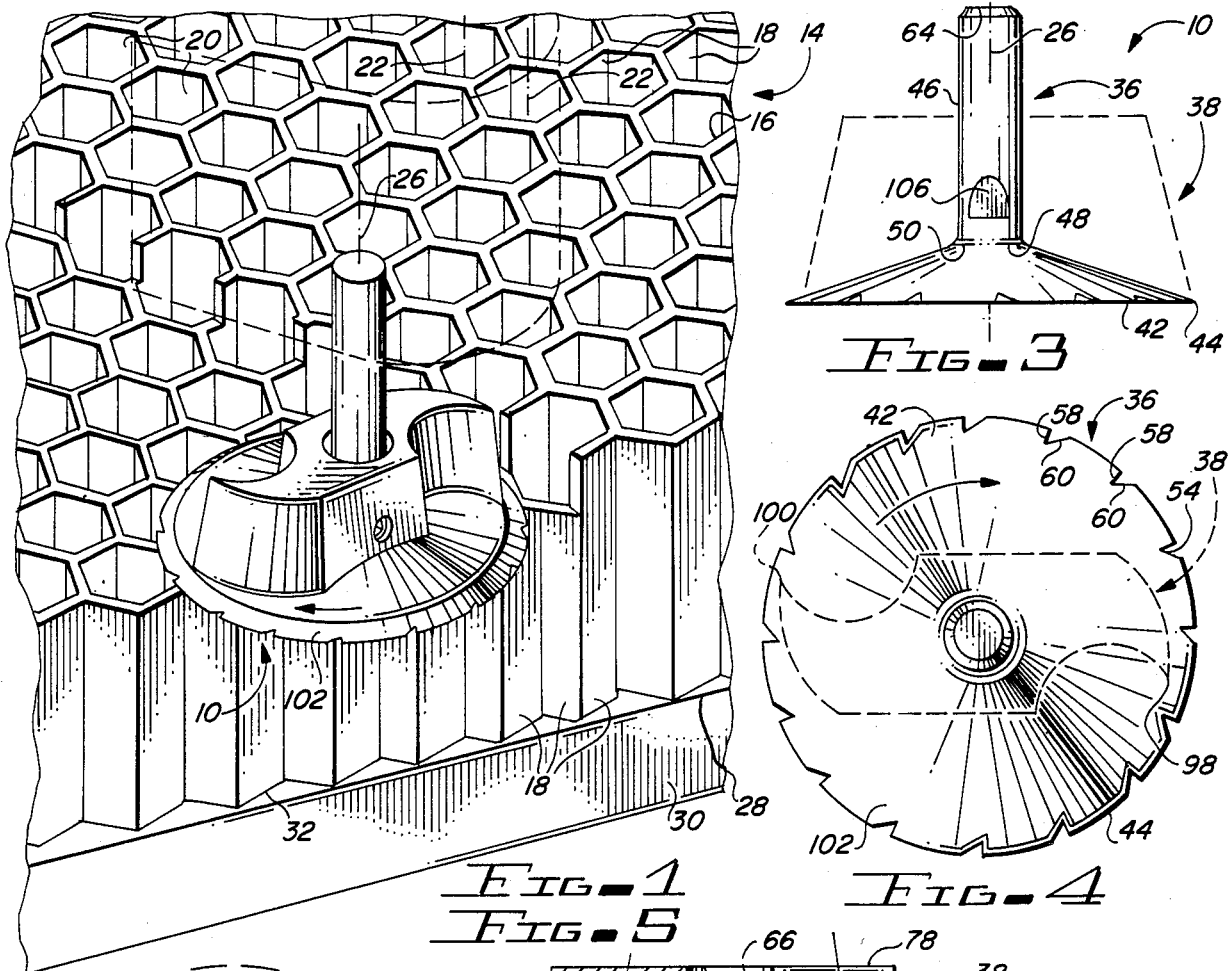
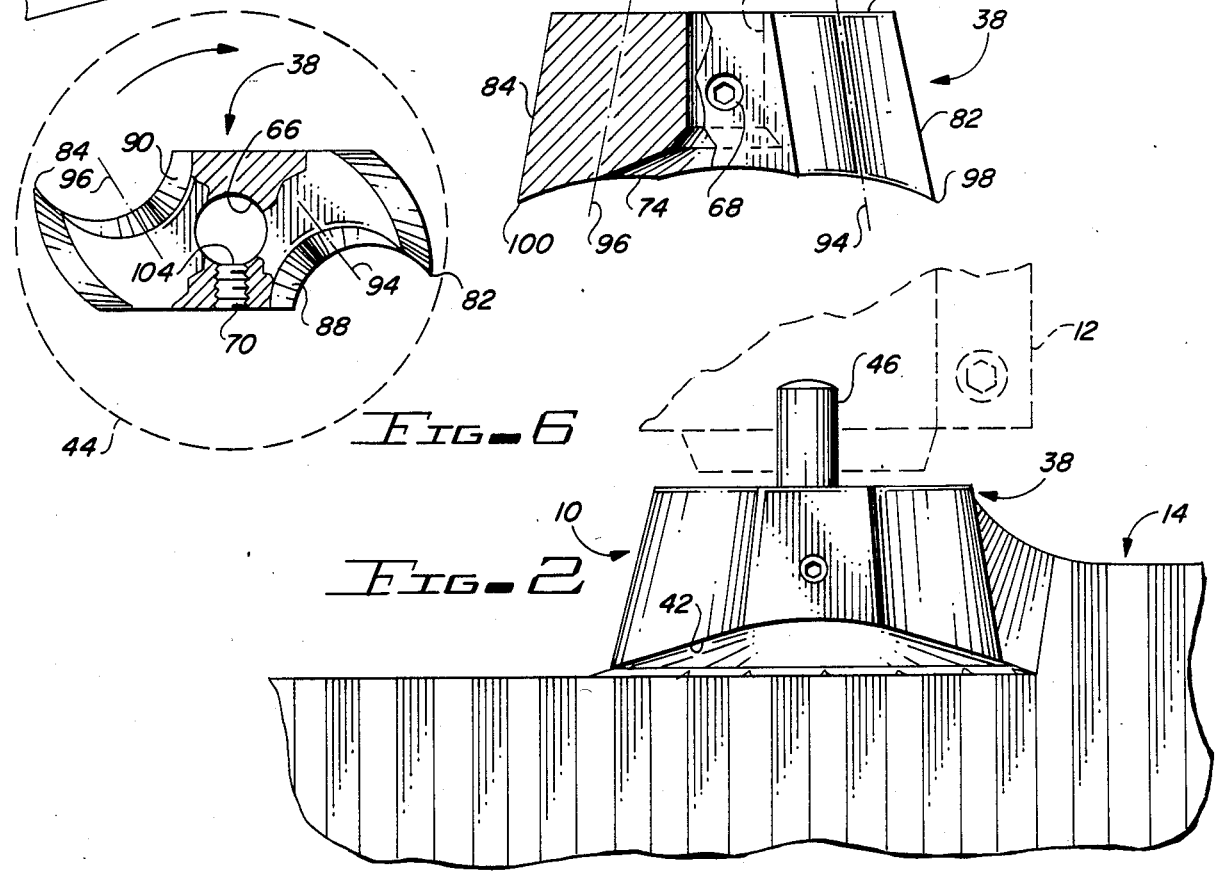

HONEYCOMB CUTTER AND CHIP BREAKER/CHAF REMOVER

BACKGROUND OF THE INVENTION

1. Field of the Invention

This invention relates generally to apparatus for cutting honeycomb material and for breaking the cut chips and for removing the broken chaf material therefrom and, more particularly, to a rotatable assembly or tool for the continuous cutting of a workpiece of honeycomb material while continuously and simultaneously breaking chips from the cut honeycomb material and while continuously and simultaneously removing such broken chips or chaf away from the workpiece.

2. Description of the Prior Art

In the design and fabrication of many products, the ratio of strength to weight is of great significance. Typical products which require a high strength to weight ratio are civil aircraft, military aircraft, missiles, and the like. One material which has been found to offer excellent strength at reduced weight, thus making it highly suitable for use in such products, is a cellular or honeycomb material formed of symmetric walls of aluminum. Such material has, however, been found difficult to slice, cut, shape, or otherwise machine into desired configurations for incorporation into the intended final products. This is because honeycomb material is easily deformed during such machining.

When machining a workpiece of a readily deformable material such as a honeycomb material with conventional slicers, cutters, shapers, or the like, undesirable material deformations such as burrs, bent edges or similar deformations are too often created in the area where the tool contacts the material. Under such circumstances, the machined surface of the honeycomb material may become ragged or distorted rendering it unsuitable for use in the intended final product where a smooth surface is necessary for maximum compressive strength at the interface of the honeycomb surface to an adjacent structural component of the intended final product.

The difficulty of slicing, cutting, shaping or otherwise machining honeycomb material becomes even more pronounced when profiling, i.e., machining rounded contours or other non-planar surfaces. This is because the application of diverse or varying forces by the tool on the workpiece tends to distort the workpiece even more than during a planar cut. Similar difficulties arise when diverse or varying cutting forces are generated due to variations throughout the face of the honeycomb material. Such variations in the workpiece material may arise from different thicknesses in the wall material, different sizes and shapes of the spacings between the walls, or any other type of variation within the honeycomb material, from area to area.

One approach to the matchining of honeycomb material is described in U.S. Pat. No. 2,929,299 to Jenkins. According to that disclosure, a complex rotary cutting tool is employed for slicing a workpiece. The tool includes inner and outer rotary cutting discs having teeth directed in opposite directions. The discs are counter-rotated with respect to each other so that teeth on the exterior side of the upper disc can shred the cut cellular material adjacent the path of the cutter.

In another prior patent, U.S. Pat. No. 2,894,583 to Johnstad, a rotary cutting tool is disclosed for use on honeycomb material. The tool has a removable cutter blade comprising a peripherally sharpened ring of carbide material. The edges are not serrated and there is no disclosure of a chip breaker or chaf remover.

Additional rotary cutters are disclosed in prior patents but are not designed for machining honeycomb material. Among such additional prior patent disclosures are U.S. Pat. No. 1,559,680 to Denne which shows a disc cutter having a sinuous cutting edge which may advance toward, or recede from, the workpiece thus forming a succession of slicing cuts. U.S. Pat. No. 3,027,106 to Brooks shows the combination of a disc-shaped tooth cutter and a chip breaker drum joined for concurrent rotation. U.S. Pat. No. 692,028 to Page shows a power operated hand tool having a smooth edged cutting disc and an adjacent disc having a toothed edge. The edge of the smooth disc is recessed slightly from the edge of the toothed disc clamped thereto. The function of the spaced discs is to enable an operator to cut essentially parallel grooves. Lastly, U.S. Pat. No. 3,001,558 to Showler discloses a drum-shaped cutter head having cutter faces. The drum is removably attached to a lower support ring or disc.

Of the above-described prior disclosures, only those to Jenkins and Johnstad are suitable for machining workpieces of honeycomb material. Neither of these disclosures, however, teaches apparatus for slicing with one tool element while breaking the cut chips and removing the broken chaf with another tool element, all concurrently and in a continuous manner. All of the prior art tools require that the cut or sliced material be removed by hand by interrupting or stopping the cutting process.

As illustrated by the great number of prior patents, efforts are continuously being made in an attempt to accurately and conveniently slice, cut, shape, or otherwise machine workpieces of honeycomb material. Nothing in the prior art discloses or suggests the present inventive combination of component elements for accurately and conveniently machining a honeycomb workpiece. The present invention achieves its purposes, objectives, and advantages over the prior art through a new, useful, and unobvious combination of component elements for slicing or cutting a honeycomb workpiece continuously and concurrently while chopping or breaking chips of the cut material and while continuously and concurrently conveying or removing the separated broken chips or chaf, all with a minimum number of functioning parts, at a minimum of cost, and through the utilization of only readily available materials and conventional components.

These objectives and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary of the invention and detailed description describing the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into apparatus including a tool for machining a workpiece of honeycombed material or the like comprising, in combination, a honeycomb cutter member and a chip breaker/chaf remover device. The honeycomb cutter member includes a cutting knife and an axial shaft. The cutting knife is disc-shaped and rotatable about its center and has a sharp, peripheral edge extending radially outwardly to slice or cut a workpiece when rotated. The shaft has an inboard end adapted to be received by rotational motion imparting mechanisms. The shaft also has an outboard end secured to the cutting knife for rotation therewith, with the axis of rotation of the shaft passing through the center of the cutting knife. The chip breaker/chaf remover device has a central, axial bore mountable over the shaft with the outboard face of the chip breaker/chaf remover device located in association with the inboard face of the cutting knife for rotation therewith. The chip breaker/chaf remover device has sharp, essentially circumferentially directed, radially outward breaker edges located radially inwardly of the radially outward edge of the cutting knife for breaking previously cut portions of the workpiece. The peripheral edge of the cutting knife may be serrated or smooth. The chip breaker/chaf remover device has a radial, threaded aperture and further includes a set screw located within the threaded aperture for releasably coupling the chip breaker/chaf remover device to the honeycomb cutter member. The chip breaker/chaf remover device has two breaker edges located radially inwardly from the peripheral edge of the cutting knife to chop or break chip material previously cut from the workpiece by the cutting knife. The breaker edges are skewed with respect to the axis of rotation and slant circumferentially and radially inwardly away from the outboard face of the chip breaker/chaf remover device. The chip breaker/chaf remover device includes a pair of semicircular surfaces located radially inwardly of the breaker edges for conveying or removing chaf previously cut by the cutting knife and broken by the breaker edges. The axes of curvature of the semicircular surfaces are generally aligned so as to define the skew and slant of the the breaker edges. The cutting knife and the chip breaker/chaf remover device are fabricated of high speed tool steel. The cutting knife is plated with titanium nitride.

The foregoing has outlined rather broadly the more pertinent and important features of the present invention in order that the detailed description of the invention that follows may be better understood whereby the present contribution to the art can be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the nature, objects, and advantages of the present invention, reference should be had to the following detailed description taken in conjunction with the accompanying drawings in which:

FIG. 1 is a perspective view of the inventive assembly or tool shown as a honeycomb cutter member and chip breaker/chaf remover device constructed in accordance with the principles of the present invention and also showing the workpiece formed of honeycomb material;

FIG. 2 is a side elevational view of the tool shown in FIG. 1 illustrating the cutting of a workpiece of honeycomb material and, in phantom view, a portion of the motion imparting mechanisms to which the present inventive tool may be coupled;

FIGS. 3 and 4 are a side elevational view and top plan view, respectively, of the honeycomb cutter member as shown in FIGS. 1 and 2 and illustrating, in phantom view, the honeycomb cutter/chaf remover device; and FIGS. 5 and 6 are a side elevational view and top plan view, respectively, of the chip breaker/chaf remover device shown in FIGS. 1 and 2.

Similar reference numerals refer to similar parts throughout the several drawings.

DETAILED DESCRIPTION OF THE INVENTION

Shown in the Figures, particularly FIGS. 1 and 2, is the honeycomb cutter and chip breaker/chaf remover assembly or tool 10. This entire machining assembly is shown in FIG. 2 with the assembly or tool mounted in the motion imparting mechanisms 12 such as a milling machine or the like for providing the entire assembly with the desired motion for functioning in the intended operational manner.

The honeycomb cutter and chip breaker/chaf remover assembly of the present invention is adapted to be secured within motion imparting mechanisms to provide the required rotational motion to effect the intended cutting, breaking, and removing actions upon the workpiece 14. The motion imparting mechanisms also can provide the motion of the tool with respect to the workpiece to effect a continuous machining action to sequential parts of the workpiece to fabricate it into the desired shape. The motion imparting mechanisms may be automatically or numerically controlled as by a computer to control such machining in a predetermined manner as through proper cuts of the workpiece including varying depths, positions, contourings, and so forth.

In FIGS. 1 and 2, the assembly 10 is shown in operational contact with a honeycomb workpiece 14 which is being machined. The honeycomb workpiece is shown as constructed with an exposed exterior surface 16 of aluminum foil walls 18 forming symmetric hexagonally-shaped apertures 20 in a continuous and concentric pattern. The axes 22 of the apertures 20 of the honeycombs of the workpiece are parallel to each other as well as to the axis of rotation 26 of the various component elements of the assembly. There are shapes other than the disclosed hexagonal shapes of the preferred embodiment which may be acted upon by the present invention. These other shapes include a wide variety of generally symetric patterns which are well known in the art.

The honeycomb material is adhered along a bond line 28 to a more rigid tooling surface 30 for securely and accurately locating the honeycomb material during its machining. The bond line between the honeycomb material and tooling material may include polyglycol 32 to insure the fixed positioning of these contacting materials with resepct to each other during machining. The bond may thus be dissolved, as through heating, when the machining is completed to allow the honeycomb material to be used by itself without the tooling surface material in a further fabrication step.

Included within the assembly 10 of the present invention are two major components: the honeycomb cutter member 36 and the chip breaker/chaf remover device 38.

The honeycomb cutter member 36 includes a thin disc-shaped cutting knife 42 with a sharpened peripheral edge 44 to constitute a rotary cutting surface. The honeycomb cutter member 36 also includes a shaft 46 secured at its outboard end 48 to the center 50 of the cutting knife 42. The securement is preferably permanent as by forming the shaft and cutting knife as a single piece or member. The radially outward or peripheral edge 44 of the cutting knife 42 is honed to taper downwardly toward the outboard face of the assembly to form a sharp cutting edge. As used herein, the terms "outboard, outboardly, lower, down, downwardly" or the like are intended to mean at that end, or toward that end, of the assembly adjacent the honeycomb workpiece and remote from the motion imparting mechanisms. This is the lower end as seen in FIGS. 1, 2, and 3. The terms "inboard, inboardly, up, upper, upwardly" or the like are intended to mean that end, or toward that end, of the assembly away from the honeycomb workpiece and toward or adjacent the motion imparting mechanisms. This is the upper end as shown in FIG. 1. It should be understood, however, that the present invention might be utilized in any angular orientation with respect to a workpiece as a function of the expediency of the work to be done. The terms "radial, radially inward, radially outward, circumferential", or the like are intended to mean locations or directions with respect to the axis of rotation 26 of the tool 10. The above quoted words as used herein are not intended to limit the invention.

The cutting knife 42 may also be provided with teeth or serrations 54 shown in the preferred embodiment as being 16 in number and extending radially inwardly from the peripheral edge a distance slightly greater than the extent of the taper. The edges of the teeth include a short edge 58, radial with respect to the axis of rotation and a long edge 60 at an angle of about 60 degrees with respect to the short edge or radius. It has been found that a serrated cutter knife has been found to provide preferred results, particularly when cutting a honeycomb material with rigid bonding or filling materials that are used to combine varying densities of honeycomb materials. A smooth but sharp edge, not serrated, has been found to perform the cutting function adequately for most regular honeycomb surfaces.

Upstanding from the center of the cutting knife and integrally fabricated therewith is the shaft 46. The outboard end 48 of the shaft is coupled with the inboard face of the cutting knife while the inboard end 64 of the shaft is free for being received by the motion imparting mechanisms. The axis of rotation 26 of the shaft passes through the center of the cutting knife.

In addition to the honeycomb cutter member 36, the assembly 10 also inlcudes the chip breaker/chaf remover device 38 with is adapted to be removably positioned inboardly of the cutting knife. This device is provided with an axial, central bore 66 for axially mounting on the shaft 46 of the honeycomb cutter member 36. A threaded radial aperture 68, generally central of the axial extent of the device is threaded to receive a set screw 70 for securing the device 38 to the shaft 46. This will allow the device to rotate concurrently with the cutter knife during operation and use. The lower or outboard face 74 of the device is dished to provide a concave surface that matches, and allows contact with, the upper or inboard face of the cutting knife during operation and use.

The upper or inboard face 78 of the chip breaker/chaf remover device is of a lesser diameter than its lower or outboard face 74. This allows for the radial and circumferential slanting of the two breaker edges 82 and 84 away from the outboard face 74 of the device 38 to effect the efficient breaking of chips of honeycomb material previously cut by the rotating cutter knife. The breaker edges are thus skewed with respect to the axis of rotation of the shaft. The breaker edges are also sharpened to achieve their function of separating portions of the workpiece, previously cut by the cutting knife, from the remainder of the workpiece. The breaking occurs through the clockwise rotation of the cutting knife and device as illustrated by the arrows of the Figures. The particular slanting of the breaker edges 82 and 84 of the device permits the breaker edges to first contact and break the lowermost edges of the cut workpiece and then continue upwardly of the workpiece, then to sequentially separate additional parts from the remainder of the cut parts of the workpiece. This breaking action might be considered to be similar to a chopping action. Note the various operational actions upon the workpiece as illustrated in FIGS. 1 and 2.

Slanting the breaker edges of the device as described also allows a pair of essentially semicircular chaf removing surfaces 88 and 90 to function with the slanting breaker edges of the device to convey or remove the broken chaf from the workpiece. The semicircular surfaces begin radially adjacent the bore 66 and extend radially outwardly, terminating adjacent the breaker edges 82 and 84. The breaker edges thus face essentially circumferentially with respect to the axis of rotation of the tool, with their breaking edges facing in the direction of rotation whereby they may efficiently act upon the workpiece being machined.

The centers of curvatures 94 and 96 of the semicircular surfaces lie on axes and skewed with respect to the axis of rotation of the tool. The axes of the semicircular surfaces, like the breaker edges, slant circumferentially backwards and radially inwardly away from the outboard face of the device.

Outermost lower points 98 and 100 of the breaker edges of the device extend a distance from the axis of rotation less than the cutting edge of the cutter knife to insure that only cut portions of honeycomb are cut or broken by the chip breaker edges of the device. The honed circumferential surface 102 of the cutting knife is preferably uncovered by the lower face of the device to allow for the full cutting of the workpiece. The slanting of the breaker edges and semicircular surfaces of the device allows for continuous and sequential breaking or cutting contact and chaf removal by the device through a wedge-like action of the slanting semicircular surfaces of the device during rotational operation and use of the assembly.

The exact actions of the cutting knife on the honeycomb workpiece and the breaker edges on the cut material and the semicircular surfaces on the chaf is not fully known since the actions can not be readily viewed when the tool is operating at high speeds of rotation, up to 10,000 revolutions per minute. The descriptive material as set forth above explains the actions as best as they are understood or, at least, as best as it would be anticipated.

As can be readily understood, the design and construction of the tool as an assembly with separable elements allows the parts to be interchanged for different jobs. More importantly, however, it allows for one damaged or worn element to be replaced with another. This is particularly important since the life of the chip breaker/chaf remover device is normally several times greater than that of the cutter member.

In operation and use, an appropriate cutter member 36 is selected and an appropriate chip breaker/chaf remover device 38 is also selected. The appropriate chip breaker/chaf remover device is then axially mounted on the shaft 46 of the cutter member 36 with its outboard face 74 adjacent, but preferably in flush mating contact with, the inboard face 78 of the cutting knife 42. The peripheral edge 44 of the chip breaker/chaf remover device 38 is located slightly radially inwardly of the honed circumferential surface 102 of the cutting knife. A set screw 70 is screwed into a radial, threaded aperture 68 of the chip breaker/chaf remover device so that its radially inward face 104 frictionally secures the chip breaker/chaf remover device to the shaft of the cutter member whereby rotation of the shaft and cutter knife will rotate the breaker/chaf remover device concurrently therewith at speeds sufficient to effect the desired functions during normal operation and use. The area of the shaft 46 of the cutter member 36 is formed to provide a flat surface 106 for being contacted by the inward face 104 of the set screw 70 which is also flat. This relationship helps to provide a more secure attachment between the components of the assembly.

When power is applied to the motion imparting mechanisms 12, with the shaft 46 of the cutter member 36 operationally located and secured therein, motion of the assembly 10 with respect to a honeycomb workpiece 14 will first allow the cutting knife to slice the workpiece to virtually any desired extent, depth or direction or sculpturing. Maximum efficiency is achieved when the depth of the cut during machining is less than the axial length of the chip breaker/chaf remover device. The cut segments of the workpiece will then be chopped or broken away from the remainder of the workpiece by the radially exterior breaker edges 82 and 84 of the chip breaker/chaf remover device 38 as it contacts first the portion of the cut workpiece adjacent its cut and then sequentially chops or breaks the more inboardly portions of the cut workpiece. The rotation of the device then allows the semicircular surfaces 88 and 90 of the device to remove the cut and broken chaf of the honeycomb material to remote of the area where the cutting and the breaking has occurred. Radial movement of the tool with respect to the workpiece, or even axial movement therebetween, can thus effect the desired machining of the honeycomb material of the workpiece. Concurrent and continuous operation of the assembly may thus be effected without stopping for the removal of the cut and broken chaf material which was not previously possible. This increases the convenience and efficiency of machining honeycomb or similar material.

It is preferred that all of the component elements of the assembly be fabricated of high speed tool steel hardened to a high degree. For longer life of the cutter knife, it is preferably plated with a life-extending material such as titanium nitrite or the like.

The present disclosure includes that information contained in the appended claims as well as that in the foregoing description. Although the invention has been described in its referred form or embodiment with a certain degree of particularity, it is understood that the present disclosure of the preferred form has been made herein only by way of example and that numerous changes in the details of construction, fabrication, and use, including the combination and arrangement of parts, may be resorted to without departing from the spirit and scope of the invention.

What is claimed is:

1. A tool for machining a workpiece of honeycombed material or the like comprising, in combination:
   a honeycomb cutter member, said honeycomb cutter member having a cutting knife and an axial shaft, said cutting knife being disc-shaped and rotatable about its center, said cutting knife having a sharp, peripheral edge extending radially outwardly to slice or cut a workpiece when rotated, said shaft having an inboard end adapted to be received by a rotational motion imparting mechanism, said shaft having an outboard end secured to said cutting knife for rotation therewith, with the axis of rotation of said shaft passing through the center of said cutting knife; and
   a chip breaker/chaf remover device having a central, axial bore mountable over said shaft with the outboard face of said chip breaker/chaf remover device located in association with the inboard face of said cutting knife for rotation therewith, said chip breaker/chaf remover device having at least one sharp, essentially circumferentially directed, radially outward breaker edge located radially inwardly of the radially outward edge of said cutting knife for breaking previously cut portions of the workpiece, said breaker edge being skewed toward the axis of rotation of said shaft as the edge recedes from the cutting knife, and said breaker edge also being slanted circumferentially backward from the cutting edge to provide progressive relief both inwardly and backwardly from the cutting edge.

2. The tool as set forth in claim 1 wherein said peripheral edge of said cutting knife is serrated.

3. The tool as set forth in claim 1 wherein said chip breaker/chaf remover device has a radial, threaded aperture and further including a set screw located within said threaded aperture for releasably coupling said chip breaker/chaf remover device to said honeycomb cutter member.

4. The tool as set forth in claim 1 wherein said chip breaker/chaf remover device has two breaker edged located radially inwardly from said peripheral edge of said cutting knife to chop or break chip material previously cut from the workpiece by said cutting knife.

5. The tool as set forth in claim 1 wherein said chip breaker/chaf remover device includes pair of semicircular surfaces for each breaker edge and located radially inwardly of said breaker edge for conveying or removing chaf previously cut by said cutting knife and broken by said breaker edge.

6. The tool as set forth in claim 1 wherein said cutting knife and said chip breaker/chaf remover device are fabricated of high speed tool steel.

7. The tool as set forth in claim 6 wherein said cutting knife is plated with titanium nitrite.

8. A tool for machining a workpiece of honeycombed material or the like comprising, in combination:

a honeycomb cutter member, said honeycomb cutter member having a cutting knife and an axial shaft, said cutting knife being disc-shaped and rotatable about its center, said cutting knife having a sharp, peripheral edge extending radially outwardly to slice or cut a workpiece when rotated, said shaft having an inboard end adapted to be received by a rotational motion imparting mechanisms, said shaft having an outboard end secured to said cutting knife for rotation therewith, with the axis of rotation of said shaft passing through the center of said cutting knife; and a chip breaker/chaf remover device having a central, axial bore mountable over said shaft with the outboard face of said chip breaker/chaf remover device located in association with the inboard face of said cutting knife for rotation therewith, said chip breaker/chaf remover device having at least one sharp, essentially circumferentially directed, radially outward breaker edges located radially inwardly of the radially outward edge of said cutting knife for breaking previously cut portions of the workpiece, said breaker edge being skewed toward the axis of rotation of said shaft as the edge recedes from the cutting knife, and said breaker edge also being slanted circumferentially backward from the cutting edge to provide progressive relief both inwardly and backwardly from the cutting edge, said chip breaker/chaf remover device including at pair of semicircular surfaces for each breaker edge and located radially inwardly of said breaker edges for conveying or removing chaf previously cut by said cutting knife and broken by said breaker edges, said surfaces being formed by conic sections having axes curvature oriented to produce the skew and slant of said breaker edges.

9. A tool for machining a workpiece of honeycombed material or the like comprising, in combination:

a honeycomb cutter member, said honeycomb cutter member having a cutting knife and an axial shaft, said cutting knife being disc-shaped and rotatable about its center, said cutting knife having a sharp, peripheral edge extending radially outwardly to slice or cut a workpiece when rotated, said shaft having an inboard end adapted to be received by a rotational motion imparting mechanisms, said shaft having an outboard end secured to said cutting knife for rotation therewith, with the axis of rotation of said shaft passing through the center of said cutting knife; and a chip breaker/chaf remover device having a central, axial bore mountable over said shaft with the outboard face of said chip breaker/chaf remover device located in association with the inboard face of said cutting knife for rotation therewith, said chip breaker/chaf remover device having at least one sharp, essentially circumferentially directed, radially outward breaker edges located radially inwardly of the radially outward edge of said cutting knife for breaking previously cut portions of the workpiece, said breaker edge being skewed toward the axis of rotation of said shaft as the edge recedes from the cutting knife, and said breaker edge also being slanted circumferentially backward from the cutting edge to provide progressive relief both inwardly and backwardly from the cutting edge, said chip breaker/chaf remover device having two breaker edges located radially inwardly of the peripheral edges of said cutting knife to chop or break chip material previously cut from the workpiece by said cutting knife, said chip breaker/chaf remover device including a pair of semicircular surfaces radially inwardly of said breaker edges for conveying or removing chaf previously cut by said cutting knife and broken by said breaker edges, said surface being formed by conic sections having axes oriented to produce the skew and slant said breaker edges, and means to releasable couple said chip breaker/chaf remover device and said cutter member.

* * * * *